Dec. 10, 1929.  H. C. MALLORY  1,738,913

EXPANSIBLE COLLAPSIBLE ELEMENT

Original Filed Aug. 31, 1920

INVENTOR
Sue R. Mallory, as Admx.
BY of the Est. of Harry C. Mallory, Decd.
Conrad A. Dieter
her ATTORNEY Patented Dec. 10, 1929

1,738,913

UNITED STATES PATENT OFFICE

HARRY C. MALLORY, DECEASED, LATE OF BELLPORT, NEW YORK, BY SUE R. MALLORY, ADMINISTRATRIX, OF BELLPORT, NEW YORK; SAID HARRY C. MALLORY ASSIGNOR, BY MESNE ASSIGNMENTS, TO AMERICAN RADIATOR COMPANY, OF CHICAGO, ILLINOIS, A CORPORATION OF NEW JERSEY

EXPANSIBLE-COLLAPSIBLE ELEMENT

Original application filed August 31, 1920, Serial No. 407,207. Patent No. 1,570,312, dated January 19, 1926. Divided and this application filed July 25, 1925. Serial No. 46,103.

The invention relates to elastic elements, and the same has for its object more particularly to provide an elastic metallic element for use in connection with apparatus or devices subject to or influenced by temperature or pressure variations whereby to operate a valve, apparatus or other mechanism.

Further, said invention has for its object to provide an expansible-collapsible element having a thin metal line, and an end reinforced upon its inner and outer sides whereby to give greater strength and rigidity to said closed end, and to render said element readily attachable to other parts, mechanisms or devices adapted to be operated or controlled thereby.

Further, said invention has for its object to provide an expansible-collapsible element for the purposes specified having one end interiorly and exteriorly reinforced whereby to permit of said closed end being conveniently attached or secured to other parts, mechanisms or devices to be operated by, or in connection with said expansible-collapsible element.

Further, said invention has for its object to provide an expansible-collapsible element having a thin metal line, and an end reinforced upon its inner and outer sides by separate reinforcing members, and attaching means permanently clamped into engagement with said end by the reinforcing member disposed upon the outer side of the end of said element.

Other objects will in part be obvious, and in part be pointed out hereinafter.

To the attainment of the aforesaid objects and ends the invention consists in the novel details of construction, and in the combination, connection and arrangement of parts hereinafter more fully described and then pointed out in the claims.

In the accompanying drawings forming part of this specification, wherein like numerals of reference indicate like parts, Figure 1 is a side elevation showing one form of expansible-collapsible element constructed according to, and embodying the said invention;

Figure 1:
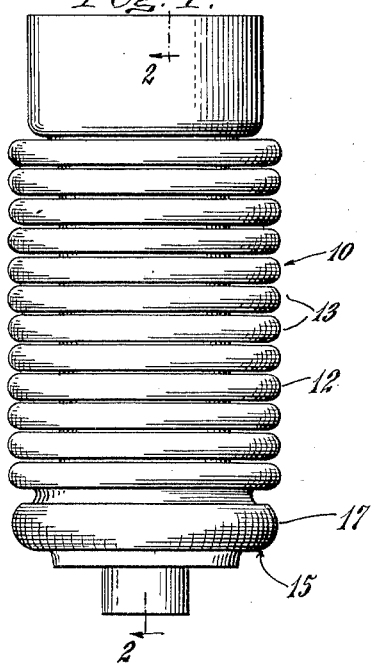
Figure 2:
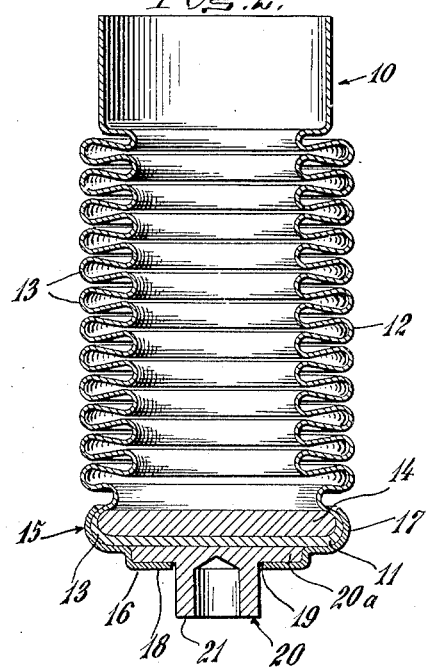
Fig. 2 is a sectional view taken on the line 2—2 of Fig. 1.
Figure 3:
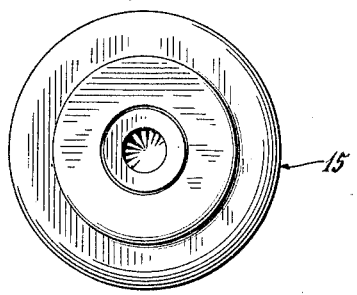
Fig. 3 is a bottom view.

In producing an expansible-collapsible element embodying the present invention there is first formed a cylindrical shell 10 having a closed end 11. The shell is then subjected to the action of suitable dies whereby to circumferentially corrugate its intermediate or body portion 12 to form a series of corrugations or folds 13. The closed end 11 in the construction illustrated at Figs. 1, 2 and 3 is of substantially the same diameter as the body portion 12, and is provided upon its inner side with a flat, circular disk 14. The said disk 14 is firmly secured in position by the first corrugation 13 formed in the side of the shell adjacent to the closed end 11.

Hereupon there is taken a shallow reinforcing cap 15 comprising a base 16 having a vertical flange or rim 17 and a central depressed or recessed portion 18 provided with an aperture 19, and into said cap is inserted an attaching member 20 provided with a flat, circular base 20ª having a reduced cylindrical portion or boss 21 extending centrally therefrom. The base 20ª of said attaching member is adapted to be received by the central depressed portion 18 of said cap, with the cylindrical portion or boss 21 thereof extending through the aperture 19 in said cap.

The cap 15 with the attaching member 20 therein is then fitted upon the closed end 11 of the corrugated shell 10, and the flange or rim 17 pressed or rolled firmly into engagement with the outer side of the first corrugation which embraces the reinforcing disk 14, and thus permanently secured thereto. The disk 14 disposed within the closed end 11 of the shell 10, and the cap 15 secured to the outer surface of the first corrugation jointly serve to interiorly and exteriorly reinforce said closed end, and the cap 15, with its attaching portion 20, serves to reinforce materially the closed end 11 of the shell 10, and at the same time said cap secures said attaching member 20 to said shell.

In the modified construction illustrated at

Figure 4:
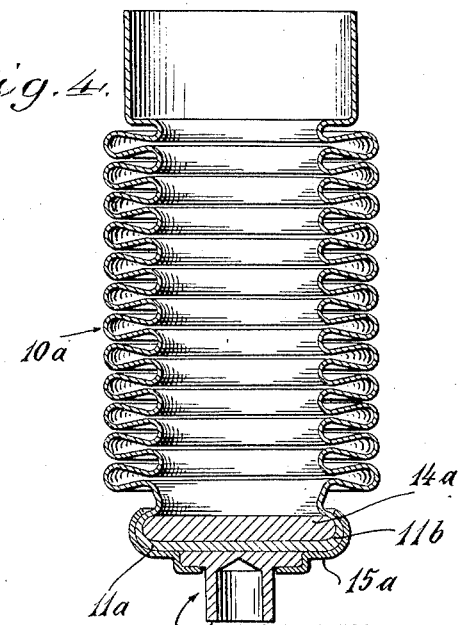
Fig. 4 is a central vertical sectional view showing a modified form.

Fig. 4, the expansible-collapsible element is constructed essentially, as the main construction, as illustrated at Figs. 1 to 3, inclusive. In the modified construction the circumferentially corrugated shell 10ª has its closed end 11ª provided with a reduced portion to form a boss 11ᵇ within which is secured a reinforcing disk 14ª, and upon the outer side of said boss 11ᵇ is secured a cap 15ª, formed like the cap 15 and containing a similar attaching member 20.

The attaching member has its projecting portion or boss 21 recessed so as to permit of said boss being interiorly or exteriorly screw-threaded or otherwise prepared for securement or connection with a valve or other element or part to be actuated by or through the corrugated portion of the shell.

This application is a division of an earlier application, Serial No. 407,207, filed by Harry C. Mallory August 31, 1920, and patented January 19, 1926, No. 1,570,312, which latter application is a continuation in part of an application Serial No. 833,593, filed by him April 22, 1914, renewed December 5, 1919, Serial No. 342,802, and patented January 25, 1921, No. 1,366,473.

In this case no claim is made for the process from which the product herein shown, described and claimed results, as said process constitutes the subject-matter of said application, Serial No. 407,207, which resulted in Patent No. 1,570,312, dated January 19, 1926.

Having thus described the said invention what is claimed and desired to secure by Letters Patent is:

1. An expansible-collapsible element comprising a shell having a circumferentially corrugated body portion, a closed end, a member disposed within said end to reinforce the same and retained therein by a portion of said shell extending over and engaging the edge of said member, a member engaging the outer wall of said end, a boss projecting centrally therefrom, and separate means for retaining said outer member in engagement with said end, substantially as specified.

2. An expansible-collapsible element comprising a shell having a circumferentially corrugated body portion, a closed end, a member disposed within said end to reinforce the same and retained within said end by a portion of said shell extending over the same, a reinforcing member arranged exteriorly of said end engaging with the portion of said shell retaining said inner member in place, a boss projecting from said exterior member, and means engaging said exterior reinforcing member and surrounding the boss thereon for securing said reinforcing member in position upon the closed end of said body portion, substantially as specified.

3. An expansible-collapsible element comprising a shell having a circumferentially corrugated body portion, a closed end, a member disposed within said end to reinforce the same and retained within said end by a portion of said shell extending thereover, a member arranged exteriorly of said end, a boss projecting therefrom, and a flanged member extending over and around the portion of said shell embracing said inner member to reinforce said portion and to secure said exterior member to said end; said flanged member having an aperture therein to receive said boss, substantially as specified.

4. An expansible-collapsible element comprising a cylindrical shell having a corrugated body portion, a closed end, a boss extending upwardly therefrom, a reinforcing disk disposed within said shell, a reinforcing cap secured upon the outer side of said shell, and a recessed portion in the exposed part of said reinforcing cap adapted to receive and hold another device or part, substantially as specified.

5. An expansible-collapsible element comprising a cylindrical shell having a corrugated body portion, a closed end, a boss extending from said closed end, a reinforcing disk disposed within said shell and engaged by the wall thereof, a reinforcing cap disposed upon the outer side of said shell having its peripheral portions engaging the part of said shell embracing said reinforcing disk, a central recessed portion on said reinforcing cap having an aperture therein, and a member secured in said recessed portion having an outwardly projecting end extending through the aperture in said recessed portion, substantially as specified.

Signed at the city of New York, in the county of New York, in the State of New York, this 22d day of July, one thousand nine hundred and twenty-five.

SUE R. MALLORY,
*Administratrix of the Estate of Harry C. Mallory, Deceased.*